(12) United States Patent
Murugan (10) Patent No.: US 7,668,080 B2
(45) Date of Patent: Feb. 23, 2010

(54) METHOD AND APPARATUS FOR IMPLEMENTING AUTOMATIC PROTECTION SWITCHING FUNCTIONALITY IN A DISTRIBUTED PROCESSOR DATA ROUTER

(75) Inventor: Sundara Murugan, Fremont, CA (US)

(73) Assignee: Pluris, Inc., Cupertino, CA (US)

( * ) Notice: Subject to any disclaimer, the term of this patent is extended or adjusted under 35 U.S.C. 154(b) by 0 days.

(21) Appl. No.: 10/083,313

(22) Filed: Feb. 25, 2002

(65) Prior Publication Data

US 2003/0161260 A1    Aug. 28, 2003

(51) Int. Cl.
*G01R 31/08* (2006.01)
*G06F 11/20* (2006.01)

(52) U.S. Cl. .................. 370/217; 370/225; 370/386

(58) Field of Classification Search ......... 370/216–220, 370/225, 359, 386; 714/6, 14
See application file for complete search history.

(56) References Cited

U.S. PATENT DOCUMENTS

| | | | | |
|---|---|---|---|---|
| 5,712,847 A | * | 1/1998 | Hata | 370/228 |
| 6,047,331 A | * | 4/2000 | Medard et al. | 709/239 |
| 6,160,806 A | * | 12/2000 | Cantwell et al. | 370/360 |
| 6,332,198 B1 | * | 12/2001 | Simons et al. | 714/6 |
| 6,724,757 B1 | * | 4/2004 | Zadikian et al. | 370/388 |
| 2003/0163555 A1 | * | 8/2003 | Battou et al. | 709/223 |

* cited by examiner

*Primary Examiner*—Hong Cho
*Assistant Examiner*—Saba Tsegaye
(74) *Attorney, Agent, or Firm*—Donald R. Boys; Central Coast Patent Agency, Inc.

(57) ABSTRACT

An automated-protection-switching (APS) software suite for distribution over multiple processors of a distributed processor router has an APS server module running on a first one of the multiple processors for managing communication and distributing configuration and state information and APS client modules running on second ones of the multiple processors, the APS client modules for monitoring interface state information, reporting to the APS server application, and for negotiating with other APS client modules. The software is characterized in that APS interface relocation from a primary interface to a backup interface is performed through direct communication between the APS client modules running on the processors supporting the involved interfaces.

2 Claims, 5 Drawing Sheets

*Fig. 1 (SONET APS (PPP)) (Prior Art)*

METHOD AND APPARATUS FOR IMPLEMENTING AUTOMATIC PROTECTION SWITCHING FUNCTIONALITY IN A DISTRIBUTED PROCESSOR DATA ROUTER

FIELD OF THE INVENTION

The present invention is in the fields of data-packet-processing and forwarding packets over a data-packet-network, and pertains particularly to methods and apparatus for enabling ASP function in a router using multiple processors and distributed functionality.

BACKGROUND OF THE INVENTION

The field of data communication has grown with the pace of new data-routing equipment, switches, and techniques that have enabled all types of data to be transmitted over wide area networks (WAN) faster and more reliably. Manufacturers are competing to introduce faster data routers and better methods for synchronizing and integrating state-of-the-art equipment provided by a variety of competitors.

Integrating various types of proprietary data routing equipment for network communication involves, among other things, dealing with different rates of data processing and transfer in terms of interfaces and interfacing data network protocols between disparate data networks.

One of the more recent advances in data routing over large WANs such as the well-known Internet network, for example, is the implementation of synchronized optical network or SONET protocol and equipment. SONET is a standardized protocol implemented along with specialized network equipment to create a special network that allows multiple data lines transmitting data at different rates and formats to be multiplexed over a single optical carrier typically at a higher speed through a SONET portion or section of the network.

A simplified example of SONET might involve multiplexing, for example, a T1 line transferring data at 1.54 Mbits/s, a T3 line transferring data at 44.736 Mbits/s, and a E1 line transferring data at 2.048 Mbits/sec, onto a single fiber-optic cable after processing the separate streams through a SONET Multiplexor system. The result is a single combined stream transferred at a higher rate, typically 51.48 Mbits/s associated with fiber-optics technology. At the other end of the SONET fiber-optic cable, the data streams are de-multiplexed and resume their original formats, characteristics and transfer rates. SONET is a midstream solution for getting data across the network between oftentimes disparate vendor interfaces. Data may travel in this fashion through established SONET network paths until the streams are terminated as far as SONET format is concerned and converted back to user formats.

Much detailed information on the SONET structure and parameters is publicly available, therefore the publicly-available detail will not be provided here except to say that the application of SONET enables subscribers to configure their router interfaces so that a multiple of such interfaces on a single router become dedicated SONET lines.

Another convention in the art of data transfer and switching is termed automatic protection switching (APS). APS comprises a protocol and software that enables a plurality, typically an aggregated group, of primary lines egressing from a router to be individually backed-up by a single backup line dedicated for the purpose.

In one application, APS is used to provide some redundancy for a group of dedicated SONET line interfaces of a router. For example, a group of separate router interfaces on the egress side of the router that are connected to SONET equipment is backed-up by a dedicated interface (backup line). Typically, for APS switchover from a primary terminal to a backup to be successful, it must occur within 50 milliseconds (ms), which is a standard set within the protocol. Also, of course, all of the primary terminal parameters, such as data transport protocols and state information must be identically implemented at the backup terminal to obtain a successful handshake at the other end of the communication path. APS fault protection is transparent to the other communicating party or system. Moreover, in the case of more than one primary SONET line requiring or requesting backup at a same time, a priority scheme may be implemented to enable priority selection of a line for backup or "relocation" as it is termed in the art.

A data router known to the inventor uses a distributive processing architecture to process data. The router is termed a terabit network router (TNR) developed to improve data routing efficiency in general, and to enable users to scale router capacity easily. The distributed processing components include line cards that interface between the internal router domain and the external connected network, fabric cards and interconnections that comprise an internal data packet routing network within the router itself, and control cards that provide control routines, messaging, and in some cases special packet processing duties.

Each card in a TNR typically has a dedicated, on-board processor and memory. Each card also typically has a plurality of physical interfaces comprising ingress/egress ports for transferring data. The present invention in preferred embodiments primarily focuses on the use of SONET APS protection on a distributed processor router, and focuses more particularly on a novel implementation and use of APS software in a distributed processor system.

Prior art routers employing one, or at most a few processors, can use conventional APS software because all of the processing involved happens on one processor for all of the SONET lines, and there is a designated backup, as will be described further below with reference to a prior-art example of FIG. 1. It was described above that the standard of 50 ms for switchover must be adhered to for APS to be successful. If a switchover process times out before completion, the communication path involved will not exhibit a successful handshake and transmission will fail. A distributed processor system cannot perform a switchover within the required time period using standard APS software. Therefore, what is clearly needed is a method and apparatus (software) that will allow APS to be successfully practiced on a multi-processor router.

SUMMARY OF THE INVENTION

In a preferred embodiment of the invention an automated-protections-switching (APS) software suite for distribution over multiple processors of a distributed processor router is provided, comprising an APS server module running on a first one of the multiple processors for managing communication and distributing configuration and state information, and APS client modules running on second ones of the multiple processors, the APS client modules for monitoring interface state information, reporting to the APS server application, and for negotiating with other APS client modules. The software is characterized in that APS interface relocation from a primary interface to a backup interface is performed through direct communication between the APS client modules running on the processors supporting the involved interfaces.

In one preferred embodiment the distributed processor router is connected to and operating on a data-packet-network, which may be the Internet network. In preferred embodiments the novel APS software is implemented to protect the integrity of a plurality of primary interfaces of the router by enabling backup of individual ones of the interfaces at any given time during router operation. In some cases the plurality of primary interfaces comprise an APS grouping of interfaces connected to a SONET network.

In preferred embodiments configuration and state information generic to a primary interface for relocation is mirrored to the client supporting the backup interface for the purpose of initializing and activating the backup interface to function as the primary interface. Typically the distributed processors communicate with each other through a network of fabric cards implemented within the router. Also in preferred embodiments all communication exchanges between the distributed APS components follow a message sequence scheme wherein each request and response has a sequence number.

In preferred embodiments of the invention interface relocation is initiated by an APS client module after detecting an event requiring relocation at the primary interface to be relocated. In various scenarios the APS grouping of interfaces may be physically supported on one processor, or distributed to and physically supported by multiple processors.

In an alternative aspect of the invention a distributed processor router is provided, comprising a plurality of communicating processors supporting a plurality of communication interfaces, an APS server module running on a first one of the plurality of processors for managing communication and distributing configuration and state information, and APS client modules running on second ones of the multiple processors, the APS client modules for monitoring interface state information, reporting to the APS server module, and for negotiating with other APS client modules. The router is characterized in that APS interface relocation from a primary interface to a backup interface is performed through direct communication between the APS client modules running on the processors supporting the involved interfaces In preferred embodiments of the router the data-packet-network is the Internet network Also in some preferred embodiments the plurality of primary router interfaces comprise an APS grouping of interfaces connected to a SONET network. Also in preferred embodiments the APS software suite includes a server application, a server-client application, and a client module. In some cases the server application runs on a control card, and the server-client application as well as the client module run on a line card.

In operation of the router indication of an event may be an APS signal received through the target interface on the backup processor, and the received APS signal may indicate one of failure or severe degradation of the target interface. The received APS signal may indicate an administrative request for interface relocation.

In preferred embodiments configuration and state information generic to a targeted interface for relocation is mirrored to the backup router interface for the purpose of initializing and activating the backup interface to function as the primary interface. The distributed processors typically communicate with each other through a network of fabric cards implemented within the router.

Still in preferred embodiments of distributed processor router all communication exchanges between the distributed APS components follow a message sequence scheme wherein each request and response has a sequence number. In some cases the primary and backup processors may comprise the same processor.

In still another aspect of the invention a method for relocating a primary router interface to a designated backup router interface using an APS suite distributed over multiple processors of a distributed processor data router is provided, comprising the steps of (a) mirroring current configuration and state information of the primary router interface to the processor supporting the designated backup router interface; (b) receiving indication of a requirement to initiate an APS switchover; (c) determining if the backup router interface is available; and (d) activating the designated backup interface using the mirrored configuration and state information.

In some embodiments there is an additional step for reporting any changed route results to a task manager responsible for distributing updated route tables to processors, and a further step for updating a forwarding data base according to a switchover made. IN preferred embodiments the distributed processor data router is connected to and operating on a data-packet-network at the time of interface relocation, and the data-packet-network may be the Internet network. The primary router interface may be a part of a group of interfaces connected to a SONET network.

In some embodiments, in step (b) the indication is received at the primary interface. In others, in step (b), the indication is received at the backup interface. The indication may be of the form of an administrative request.

In some embodiments the backup interface partly depends on a priority state of the interface requiring backup. In some cases, in step (c) the backup interface is physically located on a processor separate from that of the primary router interface. In step (a) the configuration and state information may be selected from a table of such sets of information stored on the processor hosting the backup router interface.

DESCRIPTION OF THE PREFERRED EMBODIMENTS

Figure 1:
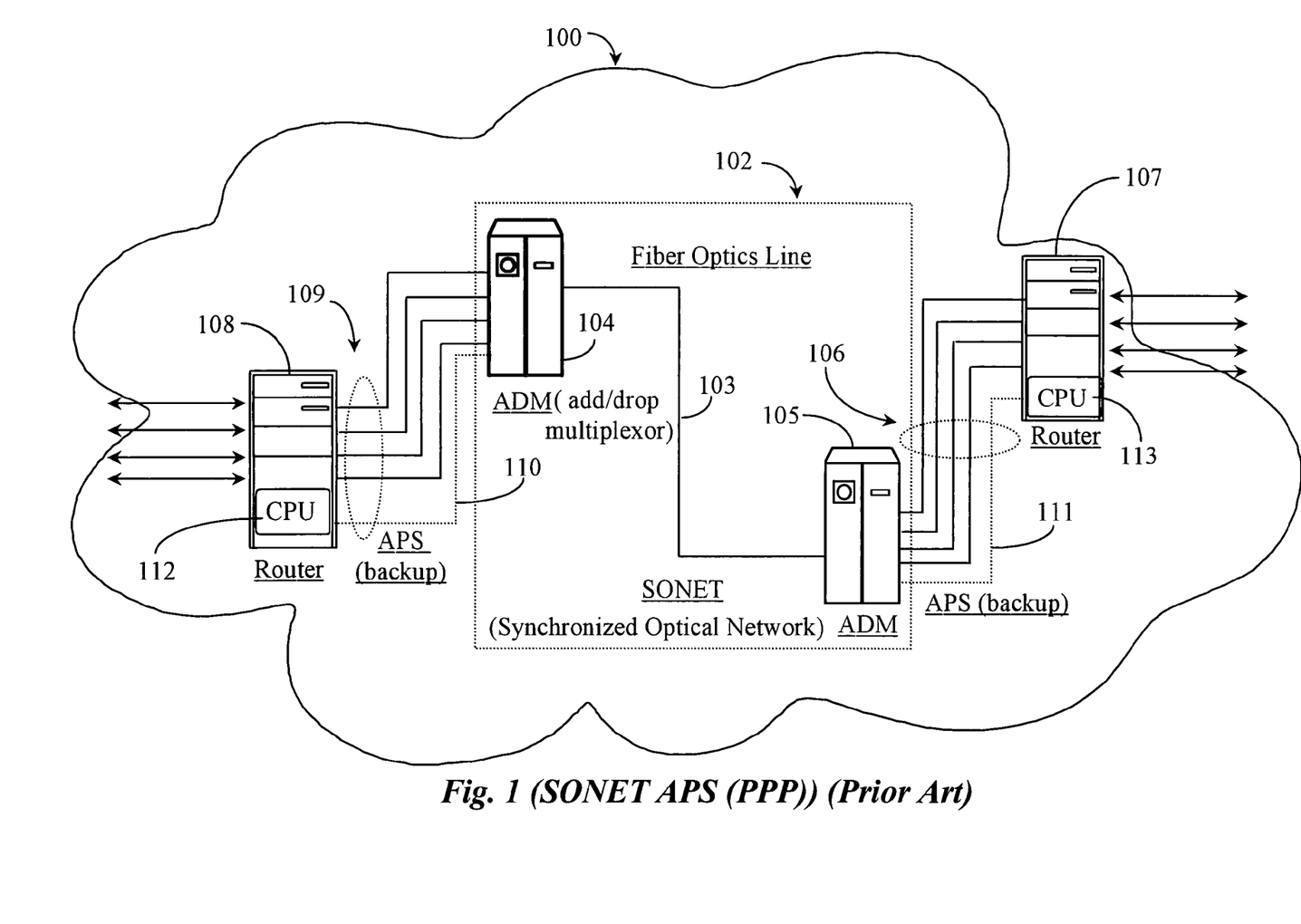
FIG. 1 is a network diagram illustrating data routers communicating through the SONET network using APS protocol according to prior art.

FIG. 1 is a network diagram illustrating data routers 107 and 108 communicating through a SONET network 102 using APS protocol according to prior art. SONET network 102 is analogous to any SONET network operating SONET protocols and equipment. In this simple example, SONET network 102 comprises an add/drop multiplexor (ADM) 104, and an ADM 105, the latter connected to the former via a fiber optics line 103. The described equipment connection represents SONET network 102. It will be appreciated that there will likely be many sections comprising SONET lines and equipment included within SONET network 102. Only two pieces of SONET equipment and a single fiber optics line connecting the two are deemed sufficient for describing the present invention.

SONET 102 is contained within a wide-area-network (WAN) 100, which is the Internet network in this example. Data router 108 is analogous to a standard prior-art data router as may be known in the art for routing data through a data-packet network. Data router 108 has a CPU 112 therein adapted to perform all packet processing of the router. Data router 108 is configured in this example for SONET operation. For example, an APS group of interfaces 109 is provided as interfaces that have connection through Internet 100 to ADM 104 within SONET 102. APS group 109 comprises 4 primary and active interfaces and one APS backup interface 110 (logically illustrated dotted line).

For the purpose of simplicity, it will be assumed that each individual APS line including backup 110 of APS group 109 comprises one egress port of router 104 that is configured for SONET and APS protection. Also for simplicity, ingress of router 108 is illustrated as 4 double-arrows implying 4 separate ports. In actual practice, all ports on router 108 are ingress/egress ports and there may be many more than 4 ports provided on each side of router 108 of which many may be active and SONET/APS configured. APS backup 110 of group 109 is typically an idle interface until backup services are required.

At the opposite end of SONET 102, router 107 is adapted identically according to the description provided with reference to router 108. The identical implementation is exemplary only, and router 107 could well be adapted differently than router 108. For example, router 107 has a CPU 113 therein adapted to perform packet processing of router 107. An APS group 106 comprises the primary and active lines and one idle APS backup line 111. In this prior-art example both routers 108 and 107 are identically adapted for APS/SONET data transfer. Therefore, it may be assumed in this example that both routers 108 and 107 have standard APS software installed therein.

If router 108 detects a failure in any one or more of the primary SONET lines within APS group 109, then APS backup line 110 will be configured to take over for the highest priority line that has failed. APS backup 110 may also be configured for one of the primary lines based on administrative request. It is important to note here that only one of the primary lines may be relocated to interface 110 at any given time. Because router 108 utilizes a single CPU 112, all of the state and configuration information of all of the primary protected lines is available locally. As a result, interface 110 may typically be configured easily within the 50-millisecond window required by APS protocol.

While APS backup 110 is functioning as one of the primary lines, the interface that is being backed up is suspended from operation until the problem with that line no longer exists, or an administrator requests a reverse switchover. When router 108 detects that a primary line currently relocated to interface 110 is up again, the interface is re-activated and the backup interface 110 becomes idle again.

In this prior-art example APS software is adapted to run on a single processor and not on multiple processors of a same router. As described with reference to the background section, it is a goal of the present invention to provide a unique distributed APS software suite that will operate with multiple-processor routers, wherein all of the required communication between distributed APS components can be completed to perform a switchover within the 50 millisecond time window provided by APS protocol. The method and apparatus of the present invention is described in more detail below.

Figure 2:
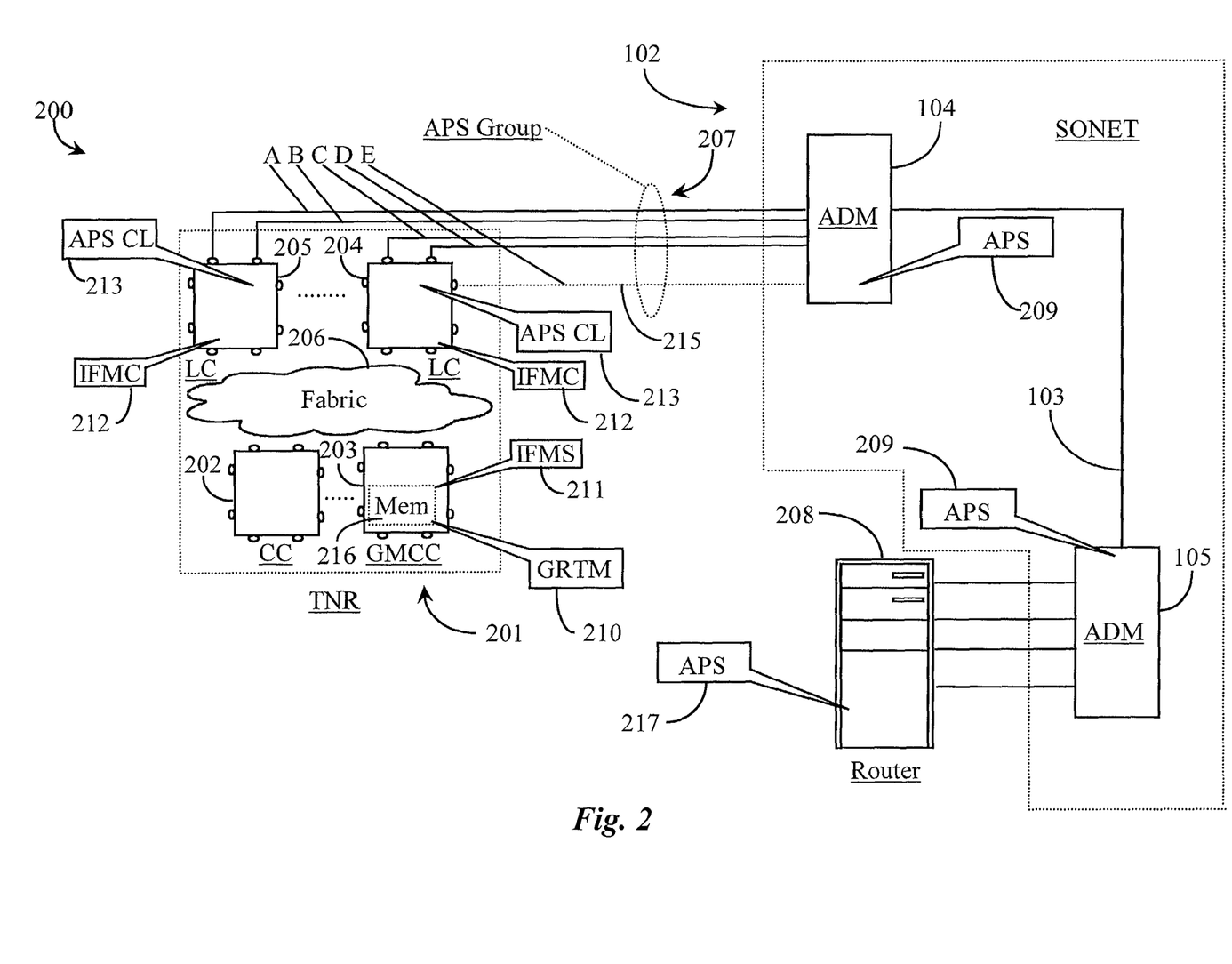
FIG. 2 is a network diagram illustrating a distributed processor router communicating through the SONET network using APS protocol according to an embodiment of the present invention.

FIG. 2 is a network diagram illustrating a distributed processor router 201 communicating through a SONET network using APS protocol according to an embodiment of the present invention. In a preferred embodiment of present invention data router 201 utilizes a plurality of processors whose functions are to distribute the responsibility of packet processing over multiple points of processing within the router. Router 201 is termed a terabit network router (TNR) by the inventor. Router 201 is hereinafter referred to as TNR 201.

In this example all of the illustrated equipment is assumed to be operating within the domain of a WAN 200 (network cloud not illustrated), which in a preferred embodiment is the Internet network. Referring now back to TNR 201, there is illustrated a plurality of processing components termed cards by the inventor. The three types of processing cards illustrated in varying detail in this example and provided within TNR 201 are line cards labeled herein as LC, control cards labeled herein as CC and GMCC (global-master-control-card), and fabric cards illustrated logically herein as a network cloud 206 labeled Fabric.

For the purpose of general description, line cards in the TNR generally represent interfaces between internal components of TNR 201 and the external network to which it is connected. Fabric 206 represent a plurality of cards interconnected to form an internal data network of operating nodes within TNR 201 over which packets are routed from ingress to egress and communications are routed between various types of cards. Control cards represent the processing components that control communication and other processes with respect to other cards in the operation and synchronization of TNR 201 as a whole.

In this example there are 2 line cards represented within TNR 201 as LC 205 and LC 204. There are 2 control cards represented within TNR 201 in this example as CC 202 and GMCC 203. GMCC 203 is designated as a master or primary control card in this specific example. Fabric 206 comprises all the fabric cards within TNR 201, and all of the interconnecting circuitry in the fabric. Data traffic addressed to any IP destination reachable through Internet 200 ingresses TNR 201 through a line card, is routed typically through fabric 206, and egresses TNR 201 through a line card as well. It is noted herein that one line card may function as an ingress/egress for a same data stream. Both the line cards and the control cards communicate with each other through fabric 206.

In this example each illustrated line card (205,204) and control card (202,203) has a plurality of physical ports. In this embodiment each card has eight physical ports, however there may be many more or fewer ports on each card without departing from the spirit and scope of the present invention. The ports for the line cards are externally-facing ports for communication with other network nodes, while the ports of a control card are for internal communication. TNR 201 has connection, in this example, to SONET-compatible network 102 through a dedicated APS group 207 as was described with reference to FIG. 1 above, with the exception that the primary line interfaces of group 207, also illustrated herein as lines A, B, C, and D are distributed over two line cards, namely card 205 and card 204 in this example. This is not required to practice the present invention but is illustrated so for discussion purposes only. In this example there are 4 primary SONET lines, two of which (A, B) connect to LC 205 and the remainder (C, D) connect to LC 204. An APS backup line 215, illustrated herein as a dotted line labeled E within APS group 207 is connected to LC 204. Using this configuration it may be described that in terms of APS group 207 LC 205 is a primary line card while LC 204 is a backup line card. This designation is made because of the location of APS backup line 215.

Although it is not specifically illustrated in this example, each physical port on LC 205 and 204 that as connection to SONET network 102 is configured according to a protocol known to the inventor as path-over-SONET (POS). POS is a SONET protocol, and a port configured to run the protocol is termed a POS device by the inventor. Hereinafter in this specification, physical ports adapted for SONET communication may be described as POS interfaces. It is noted that in actual practice there may be 14 primary POS interfaces and one backup POS interface making up a single APS group. The inventor illustrates only 4 primary and 1 backup interface in this example for simplification of description only.

It is also noted that a single POS interface comprising a SONET line may consist of multiple data channels termed SONET paths by the inventor. Each SONET path is dedicated to transmit data from a specific data flow. Therefore, multiple data flows forwarded through TNR 201 may simultaneously use a single SONET line. In one embodiment, a SONET line may be configured and dedicated to handle a single data flow at any given time. The fact that SONET protocol is used in this example in no way limits the scope of the present invention. In an alternate embodiment, physical ports on LC 205 and 204 may be configured for other data transfer protocols such as Ethernet and so on. The fact that SONET protocols and equipment are used in this example represents a preferred embodiment.

GMCC 203 is identical in physical respects to CC 202 and other CCs within TNR 201. However, in this case, GMCC 203 has a primary designation as the CC that will oversee APS switchover communication associated with APS group 207 and communicated between LCs 205 and 204. Other line cards within TNR 201 having APS/SONET primary lines and a backup line may be facilitated by some other control card adapted for the purpose, or by CC 203 as well. In this case however, it is assumed that GMCC 201 can facilitate all designated APS groups within TNR 201 regardless of distribution order among line cards.

GMCC 203 has a memory 216 provided therein and adapted to store software and data. In a preferred embodiment memory 216 is a mix of volatile and non-volatile memory. A novel APS module termed an APS interface manager is provided in distributed fashion (divided into cooperating components) on GMCC 203 as an interface manager server (IFMS) 211 and on both LCs 205 and 204 as an interface manager client (IFMC) 212. IFMS 211 functions as a facilitator and manager for communication between LCs 205 and 204 during APS switchover activity. IFMS 211 communicates with IFMC 212 through fabric 206 in the form of control messaging.

An APS client (APS CL) 213 is provided as a distributed component of the novel APS software of the present invention and is implemented in this example on both LCs 205 and 204. Because LC 205 is a primary line card (PLC) and LC 204 is a backup card (BLC) in this example, APS CL 213 on LC 205 is appropriately designated as a primary APS client (PAC) and APS CL 213 on LC 204 is appropriately designated as a backup APS client (BAC). Backup designation simply refers to the fact that LC 204 supports the designated POS interface that provides the backup services for all of the primary lines of group 207. It is noted herein that the above-described configurations can be changed at any time by an administrator without having to redistribute instances of APS CL or IFMC.

Each instance of APS CL is identical in capability to every other instance. The same is true with instances of IFMC.

SONET network 102 is analogous in every respect to the network of the same element number described with reference to FIG. 1 above. Therefore, the equipment residing therein of the same description shall retain the same element numbers and shall not be re-introduced in this portion of the description. In this example, instances of APS software 209 are provided one on ADM 104 and one on ADM 105. A router 208 is illustrated at an end of the SONET network opposite TNR 201. Router 208 may be a TNR router analogous to TNR 201, in which case an illustrated instance of APS 217 would be implemented in a distributive fashion with the same novel components described above with reference to TNR 201. In one embodiment, router 208 may be a single processor router, in which case APS instance 217 would be of a standard prior-art form adapted for single processor routers.

In a preferred embodiment of the present invention, APS negotiation is performed directly between a PLC (LC 205) in this example, and a BLC (LC 204) in this example. The primary supporting role of the control software IFMS 211 running on GMCC 203 is to manage configuration and distribute it to the appropriate line cards, as well as to mirror any relevant state information from a primary POS location A, B, C, or D to the backup POS location E.

The configuration and state information of a primary POS interface that requires backup services is mirrored to the designated backup POS location. This data is described as an interface configuration replicated set (ICRS) by the inventor. More detail about parameters of an ICRS are provided below in this specification.

In practice of the present invention using the configuration of this example, we will assume that one of primary lines A, B, C, or D has degraded in performance to the point that backup services are required. If the failure is detected on LC 205 with one of lines A or B, then LC 205 will negotiate with backup APS client 213. If however, the failure occurs on one of lines C or D on LC 204 then the negotiation for backup occurs only on that line card. In this example, it will be assumed that a failure is detected with line A on card 205 requiring two-card negotiation.

APS CL 213 is responsible for monitoring states of POS interfaces A and B and therefore detects the fail signal. APS CL notifies IFMC 212 on card 205 of the signal. IFMC 212 on card 205, using IFMS 211 as a relay station, notifies IFMC 212 on card 204 of a request for backup services for primary POS interface A. IFMC 212 on card 204 consults the state of POS interface E through APS CL 213. If it is available (not currently backing up another primary line), then a response message is sent back to IFMC 212 on card 205 indicating availability. IFMS 211 is included in all communication and response exchanges functioning to manage distribution of required information and communication management.

At this point, the appropriate configuration and state information associated with POS interface A is mirrored to POS interface E (backup) and implemented. This is possible because IFMC 212 on BLC 204 has all of the interface configuration and state information sets (ICRS) entries for all of the primary POS interfaces of APS group 207 stored locally. Updates to these data sets are distributed through IFMS 211 as reported by APS CL instances 213. It is noted herein that a PLC (205) has only local ICRS entries associated with the primary POS interfaces of an APS group that it supports, in this case, interfaces A and B of group 207. For example, an ICRS associated with POS interface A may be updated while A is currently in a state of backup.

In the event of availability of services on POS interface 215 on card 204, all of the configuration and state information associated with POS interface A on card 205 is implemented at POS interface location 215. The interface is configured and activated according to the provided information and backup services continue until a reverse switchover is ordered. In one embodiment, more than one primary may be down and requesting backup services. In this case the POS interface having the higher priority will be backed up. If a higher priority POS interface requests backup services while a lower priority interface is currently being backed up then a reverse switchover may be initiated to free the backup POS interface to service the higher priority line.

When LC 205 is unavailable global route table manager (GRTM) 210 is provided on GMCC 203. GRTM 210 is a task manager that is responsible for keeping an updated copy of all of the routing tables for TNR 201. In the event of a successful POS switchover from a primary to backup POS location, routing tables specific to the internal network (fabric 206) of TNR 201 need to be updated. POS interface A remains in a suspended state while POS interface E (215) is performing backup. Because backup is being performed on a different LC, data addressed for POS egress A should be re-routed to ingress of the BLC, in this case, LC 204. IFMS 211 notifies GRTM 210 of the requirement to perform an update and distribution process of the updated routing tables.

A command-line-interface (CLI) system is not illustrated in this embodiment, but may be assumed to be present, wherein the interface has access to a database containing all of the APS command structure and protocol parameters. IFMS software provides support for backend CLI APS software including error check and storage configurations.

The method and apparatus of the invention enables a POS backup interface, POS 215 in this example, to be configured and activated well within the required 50 ms time window. The switchover to backup, as well as reverse switchovers when primary lines are up again, is transparent to communicating parties on the SONET network.

Figure 3:
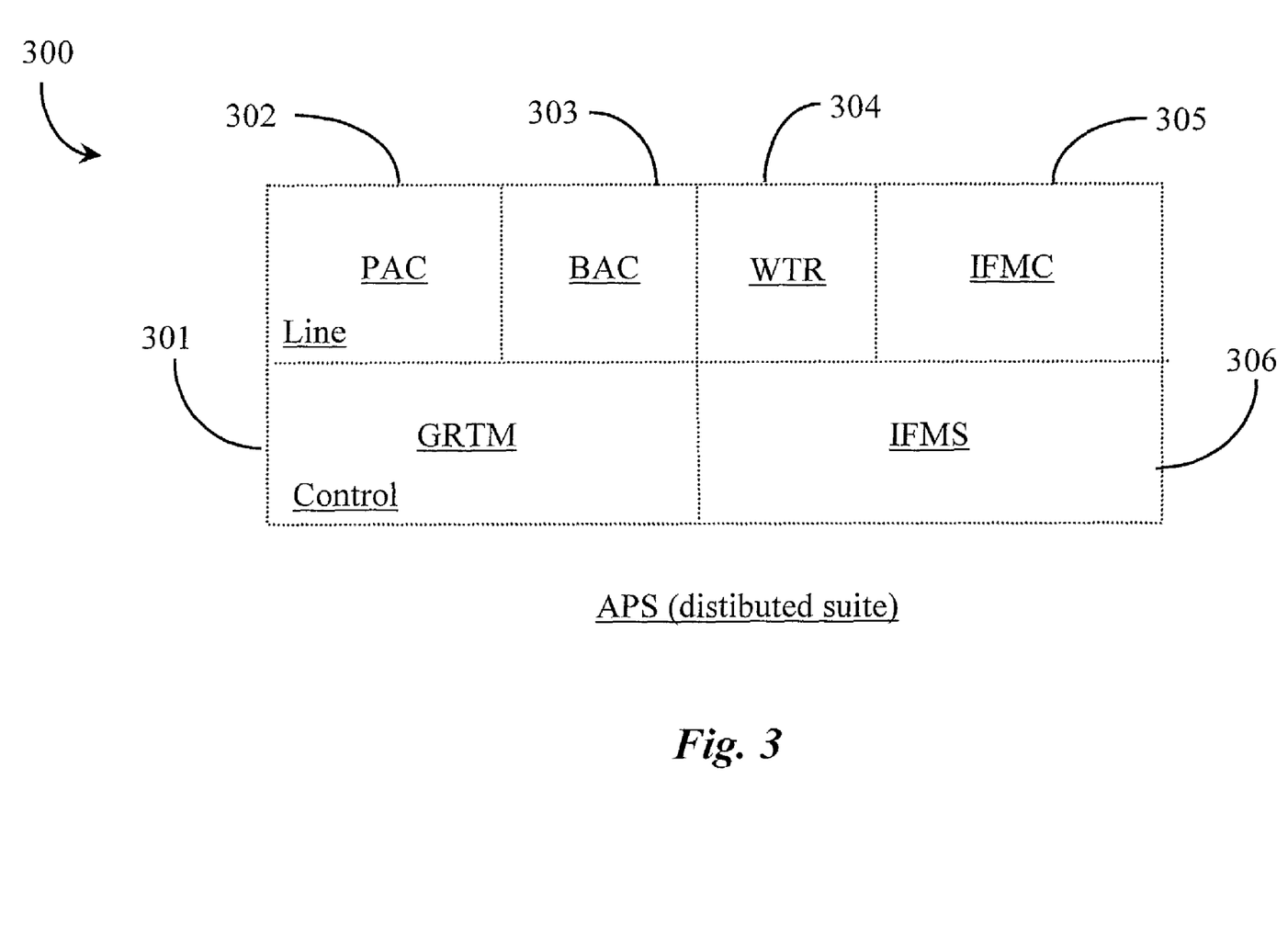
FIG. 3 is a block diagram illustrating APS components of a distributed APS software suite according to an embodiment of present invention.

FIG. 3 is a block diagram illustrating APS components of a distributed APS software suite 300 according to an embodiment of present invention. Suite 300 is made up of distributed software modules that reside on a CC and that reside on an LC as previously described with reference to FIG. 2. Not including APS software implemented at a CLI interface, the distributed components are described below.

Implemented on a control card (lower layer labeled Control) are a GRTM module 301 and an IFMS module 306. These components are analogous to GRTM 210 and IFMS 211 of GMCC 203 with reference to FIG. 2. GRTM 301 receives reconfiguration information from IFMS 211 associated with a switchover in POS interface locations. GRTM 301 then uses that information to update the global route tables in the system with the new location of the egress POS interface. GRTM 301 distributes the updated route information to all cards within TNR 201 (FIG. 2).

IFMS 306 manages communication and state distribution. When messages are being sent to IFMS 306 by client modules (IFMC), they are stamped with a sequence number retrieved in each case by an APS CL. This is to insure that no messages are considered out of order. Distributed APS clients also communicate under a timestamp rule. IFMS 306 provides update information via control messaging to APS clients through an IFMC analogous to IFMC 212 described with reference to FIG. 2.

Each line card (top layer of suite 300 labeled Line) supporting primary POS interfaces of an APS group has a primary APS CL (PAC) 302. PAC 302 is analogous to APS CL 213 of LC 205 described with reference to FIG. 2. A PAC exists on a line card that has a POS interface designated as a primary, and supports one or more primary POS interfaces of an APS group. A BAC 303, analogous to APS CL 213 of LC 204 described with reference to FIG. 2 only exists on a line card that has a backup POS interface. On a line card having a backup POS interface and a primary POS interface there is a PAC 302 and a BAC 303 residing thereon. When PAC 302 detects failures on the primary line, it communicates with the BAC of the same group. Each message sent to IFMC 302 from PAC 302 is timed-stamped using a sequence number.

A wait-to-restore (WTR) timer module 304 is provided to run on a line card that is configured as a BLC having a backup POS device. The function of WTR module 304 is to provided a time period for a POS backup to wait before initiating a reverse switchover to the primary POS interface after it is detected that it is up and running again and no longer requires backup services.

IFMC 305 is analogous to IFMC 212 described with reference to FIG. 2 above. IFMC 305 acts as a proxy agent for IFMC 306 on a CC. There is one IFMC 305 on LC within a TNR router. IFMS acts as a conduit for configuration and control information sent from IFMS 306, and also as a relay agent for POS interfaces. It functions to relay their messages to IFMS 306 on a control card. This set of messages includes all state and location-related messages.

IFMC 305 is responsible for saving a copy of POS configuration and state information locally so that the information can be fed into a POS device on demand. As such, IFMC 305 is responsible for saving state updates on a particular POS device wherein the updates are received from IFMS 306. In addition, IFMC 305 receives configuration data for all APS groups that have a primary or backup POS interface residing on that particular hosting line card.

IFMC 305 stores received configuration and state information locally and utilizes the just-received configuration and the previous configuration (if any) to determine if there have been any configuration and/or state changes. Any changes found are used to update other data structures that contain state and configuration information for applicable POS interfaces for that line card. For example, if a primary line is deleted from an APS group, IFMC 305 can delete all state and configuration information related to the one (or more) POS interfaces that run on that line from its data structures. It is noted herein that four SONET paths may be part of a single line as was described previously in this specification. POS interfaces therefore may be thought of as specific to a path, although when a location changes, all of the paths of that location change.

It will be apparent to one with skill in the art that the modules illustrated in this example will retain APS protocol standards and rules, but can provided enhanced functions that APS software currently does not provided or support. The innovative concept of APS distribution over multiple processors within a router enables such a router to enjoy APS/SONET protection by providing a communication and mirroring system that performs within the timeframe of 50 ms required for switchover by APS protocol.

Figure 4:
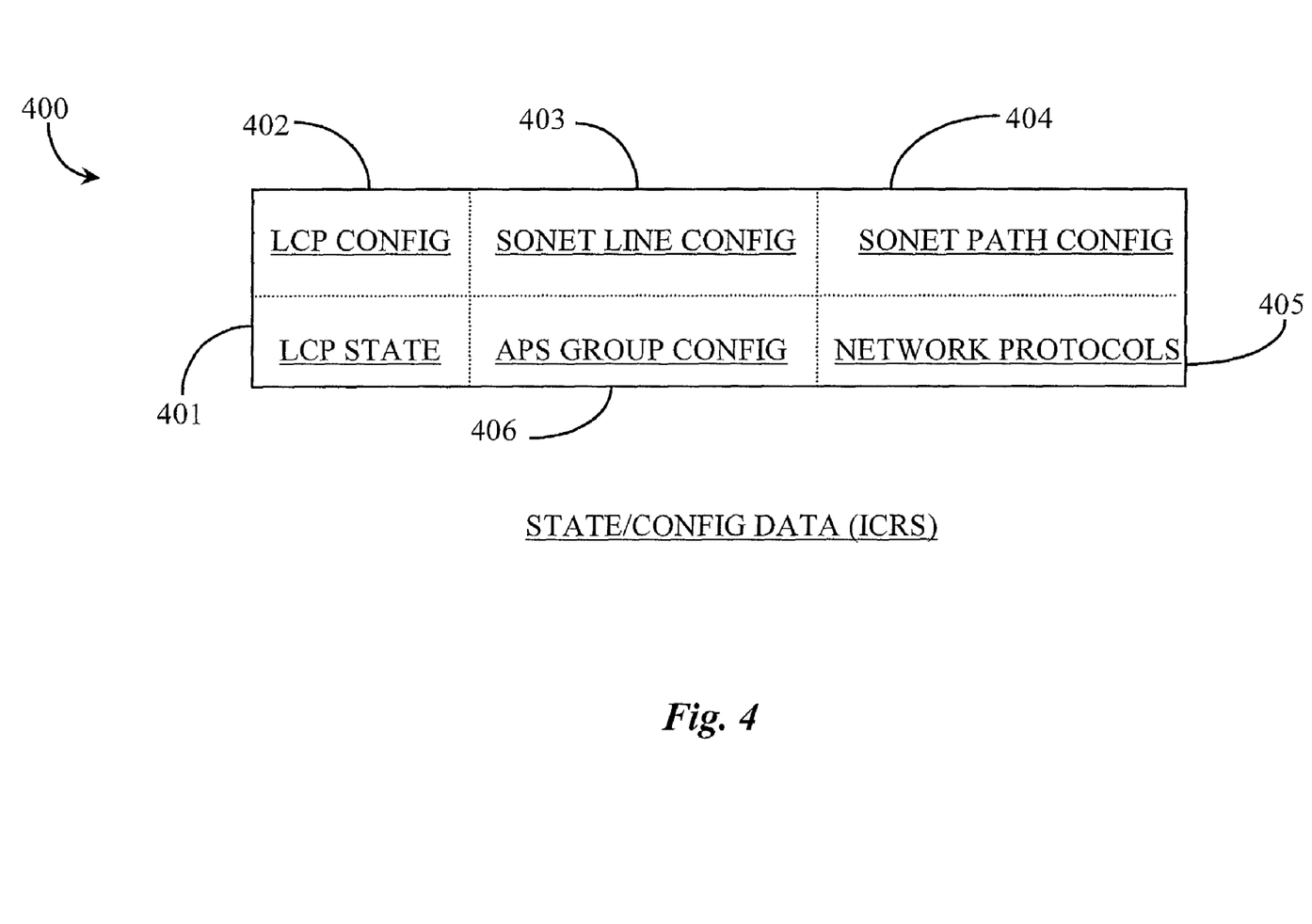
FIG. 4 is a block diagram illustrating components of an interface-configuration-replications-set according to an embodiment of present invention.

FIG. 4 is a block diagram illustrating components of an interface-configuration-replications-set (ICRS) 400 according to an embodiment of present invention. ICRS 400 comprises all of the state and configuration parameters required to completely initiate and activate a backup POS interface to provide backup services for a primary interface. Illustrated within ICRS 400 is a set of data-link layer configuration parameters (LCP CONFIG) 402. Each POS interface has its own LCP configuration parameters and 4 POS interfaces (SONET paths) may comprise a SONET line. Also included in ICRS data set 400 is data-link layer state parameters (LCP STATE) 401. LCP STATE 401 includes updated sate information updated as it is received. All LCP data must be mirrored to and reconfigured at a new POS location before switchover to backup services.

Another component of ICRS 400 is SONET line configuration data (SONET LINE CONFIG) 403. This comprises all of the data required to configure a primary line in a new location. If a SONET line includes a single SONET path, the configuration parameters may be the same. If there are 4 SONNET paths to consider, then data comprising SONET path configuration (SONET PATH CONFIG) 404 are included in ICRS 400. The network protocol layer regards each separate SONET path as a separate physical interface each dedicated to handle a separate data flow. Therefore, if a SONET line has 4 SONET paths, then it can transmit 4 separate data flows simultaneously.

An APS group may be modified on the fly by adding lines to or deleting lines from the group, by changing a backup location, and so on. Therefore, part of the ICRS data includes current APS group configuration data (APS GROUP CONFIG) 406. If an administrative order includes adding a SONET line to an APS group, then the ICRS for that group needs to be updated to reflect the modification. If a line is eliminated from a group, all of the associated parameters within the ICRS are deleted and new ICRS updates are distributed locally. In this case GRTM information must also be updated.

Other data parameters included within ICRS 400 comprise the operating network protocols and rules of transport operating over the primary line that is requesting backup. Examples of types of protocols include multi-layer-switching-protocols (MPLS), ISIS protocols, Internet Protocols (IP) and so on. In one embodiment of the present invention, a backup POS interface may be pre-configured with certain protocols that are common to all of the interfaces thereby eliminating some of the data within an ICRS. ICRS 400 is stored locally on a line card acting as a backup card or BLC so that the data may be fed to a backup POS interface on demand.

It will be apparent to one with skill in the art that providing a ready interface configuration replicated set of data required to activate and operate a primary interface locally to a backup interface eliminates much work that would otherwise be required to mirror the interface at the new location.

Figure 5:
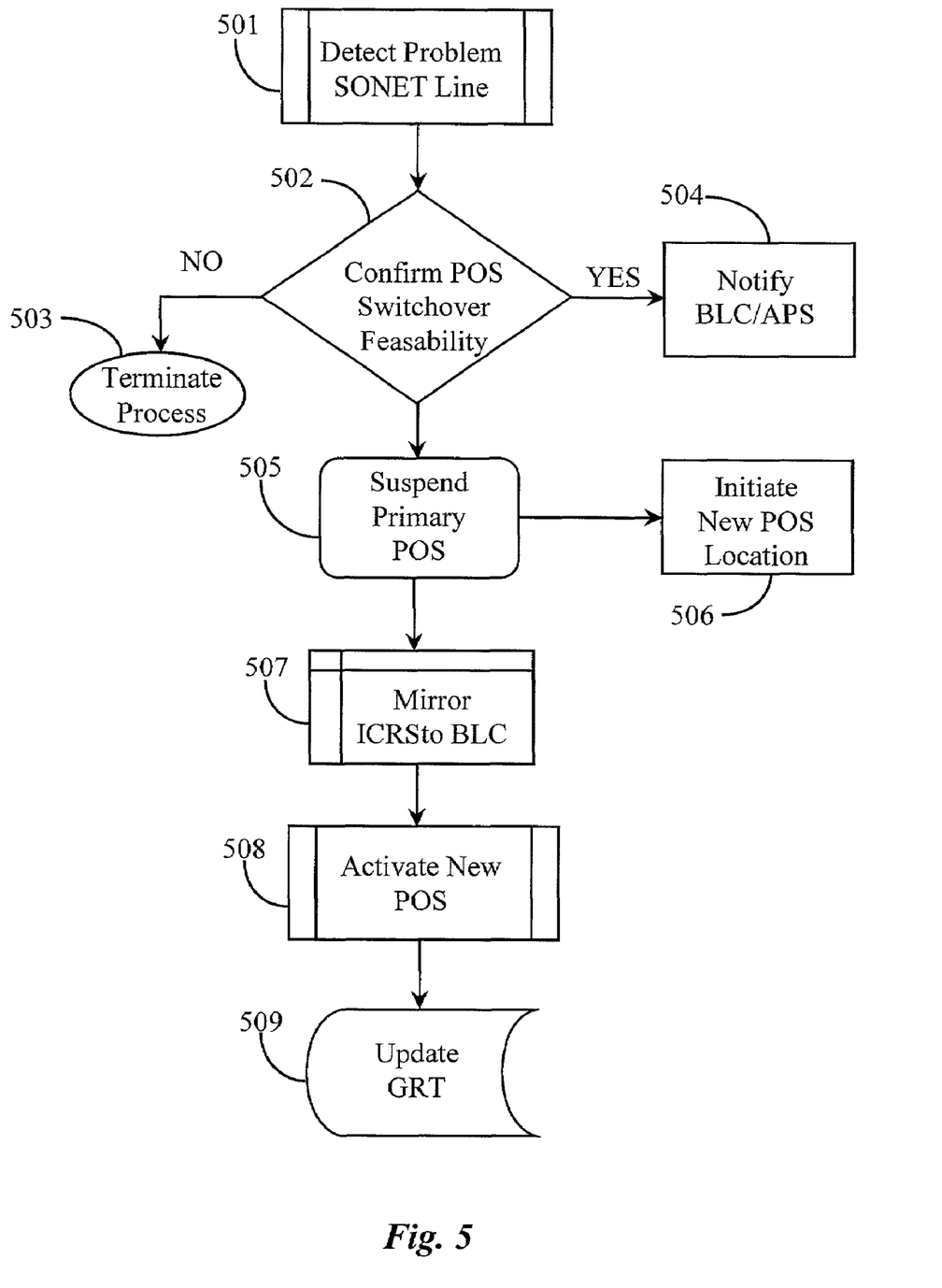
FIG. 5 is a process flow diagram illustrating steps for initiating an APS switchover according to an embodiment of present invention.

FIG. 5 is a process flow diagram illustrating steps for initiating an APS switchover according to an embodiment of the present invention. At step 501, a problem is detected on a SONET line belonging to an APS group. There are rules that exist for what type of fail signal or administrative request signal will require backup services. An APS CL running on the LC of the failed line detects the failure signal.

At step 502, the APS CL using the IFMC running on the same card sends a request to an IFMC application running on the BLC supporting the backup interface of the APS group. The request results in availability determination of backup services for the failed line. If the backup interface is busy and priority of the requesting line does not override existing priority activity, then the backup interface of the group is determined to be not available. In this case the process terminates at step 503 and the requesting line will not receive backup services. If at step 502 it is determined that the backup interface is available then the BLC APS notifies the APS primary clients that APS switchover will commence.

At steps 505 and 506, the primary POS interface needing backup is suspended and the new POS location is initiated for ICRS transfer. At step 507, the ICRS used at the primary interface is mirrored to the BLC for selection and implementation at the backup interface. Step 507 may be performed well before other steps of this process in an embodiment wherein all of the primary ICRS active in an APS group are mirrored locally to the BLC for that group. Selection from a table of ICRSs is performed on the BLC by the IFMC. Meanwhile, the IFMS running on the control card responsible for managing the APS group and supporting components updates the ICRS with any required new data in terms of state information or configuration data.

At step 508, the new POS location is activated according to the ICRS data and begins a handshake and transmission of data to the other communicating party or system. At step 509, the global route table (GRTM) is updated with new route information for data formerly using the primary that was backed up. The IFMS running on the appropriate control card notifies a GRTM running on the same card that an update and distribution of GRTM data is required.

In a preferred embodiment, a message sequence system is used to ensure that messages sent from the PLC and BLC are considered in proper order when received at the responsible CC.

It will be apparent to one with skill in the art that the steps illustrated in this example may be further divided into sub-steps without departing from the spirit and scope of the invention. For example, steps for performing message checks for errors may be integrated in to the basic APS messaging process. In another embodiment, a similar process is used to implement a reverse switchover wherein a primary interface has ceased to function and can resume without backup services. In still other embodiments, priority schemes are introduced wherein determination and selection steps can be added in case of more than one primary line requiring backup.

The method and apparatus of the present invention may be practiced over the Internet network using SONET enhancements as described in this specification, or over any WAN adapted to support the required APS and related protocols. By providing communication management and reporting APS components in distributive fashion over multiple processors, any distributed processor router can be configured for APS switchover in such a way that a switchover process occurs easily within 50 ms providing added redundancy to an already highly flexible system.

The method and apparatus of the present invention should be afforded the broadest scope possible under examination. Only the language of the supported claims, which follow, shall herein limit the spirit and scope of the invention.

What is claimed is:

1. A distributed processor packet router, comprising:
    a plurality of primary line cards each comprising a plurality of communication ports connected to lines external to the packet router, and each comprising a processor executing software managing operation of the primary line card, including the plurality of communication ports;
    a backup line card comprising a backup communication port connected to a line external to the packet router, a communication link to each of the primary line cards, a processor executing software managing operation of the backup line card, including the backup communication port, and a digital memory; and
    a control card having a digital communication link to each of the primary and the backup line cards;
    wherein the control card communicates state and configuration data regarding the plurality of communication ports to the digital memory at the backup line card, the data including priority ranking for individual ones of the communication ports, and in the event of failure of one of the plurality of communication ports, the processor at the primary line card supporting that communication port instructs the processor at the backup line card to operate the backup communication port using the state and configuration data that is stored in the digital memory for the failed communication port, the processor at the backup line card follows the instruction if the backup port is at that time not in use, and if the backup port is in use, follows the instruction only if the priority of the newly failed communication port is higher ranking than the port for which backup is at that time being performed.

2. A method for backing up ports in a distributed processor packet router, comprising the steps of:
 (a) communicating, by a control card, state and configuration data regarding primary communication ports implemented on a plurality of primary line cards to a digital memory at a backup line card having at least one backup communication port, the data including priority ranking for individual lines connected to individual ones of the communication ports;
 (b) receiving an instruction at the backup line card to operate the backup communication port according to the state and configuration data associated with one of the primary communication ports;
 (c) following the instruction if the backup communication port is not in use; and
 (d) if the backup communication port is in use, following the instruction only if the line connected to the primary communication port associated with the instruction has a higher priority than the a line connected to the primary communication port for which the backup communication port is in use.

* * * * *